United States Patent
Vuozzo

(10) Patent No.: US 9,920,250 B1
(45) Date of Patent: Mar. 20, 2018

(54) FIRE INHIBITOR FORMULATION

(71) Applicant: Eco Building Products, Inc., San Diego, CA (US)

(72) Inventor: Mark Vuozzo, San Diego, CA (US)

(73) Assignee: Eco Building Products, Inc., San Diego, CA (US)

( * ) Notice: Subject to any disclaimer, the term of this patent is extended or adjusted under 35 U.S.C. 154(b) by 0 days.

(21) Appl. No.: 15/344,298

(22) Filed: Nov. 4, 2016

Related U.S. Application Data

(63) Continuation-in-part of application No. 15/238,463, filed on Aug. 16, 2016.

(51) Int. Cl.
    *C09K 21/02* (2006.01)
    *C09K 21/04* (2006.01)

(52) U.S. Cl.
    CPC .............. *C09K 21/02* (2013.01); *C09K 21/04* (2013.01)

(58) Field of Classification Search
    CPC ................................ C09K 21/02; C09K 21/04
    See application file for complete search history.

(56) References Cited

U.S. PATENT DOCUMENTS

| | | | | |
|---|---|---|---|---|
| 2,452,054 A | * | 10/1948 | Jones | C08G 12/00 106/18.16 |
| 2,523,626 A | * | 9/1950 | Jones, Jr. | C09D 5/185 106/14.12 |
| 3,017,348 A | * | 1/1962 | Schulenburg | A62D 1/0014 252/2 |
| 3,445,384 A | * | 5/1969 | Schreiber | A62C 13/006 252/2 |
| 4,212,675 A | * | 7/1980 | Robinson | C09D 5/18 106/18.15 |
| 4,354,316 A | | 10/1982 | Schroeder | |
| 5,129,946 A | | 7/1992 | Evans | |
| 6,235,346 B1 | | 5/2001 | Barnisin, Jr. | |
| 6,620,349 B1 | | 9/2003 | Lopez | |
| 6,894,099 B2 | | 5/2005 | Moore | |
| 7,008,997 B2 | | 3/2006 | Kovacs | |
| 7,740,906 B2 | | 6/2010 | Ashmore et al. | |
| 8,029,704 B2 | | 10/2011 | Dimanshteyn | |
| 8,158,208 B2 | | 4/2012 | Richardson et al. | |
| 8,168,304 B2 | | 5/2012 | Zhang et al. | |
| 9,636,533 B2 | * | 5/2017 | Tian | A62D 1/06 |
| 2005/0217537 A1 | | 10/2005 | Knipe | |
| 2006/0086284 A1 | | 4/2006 | Zhang et al. | |
| 2006/0100340 A1 | | 5/2006 | Gao et al. | |
| 2006/0147632 A1 | | 7/2006 | Zhang et al. | |
| 2007/0160850 A1 | | 7/2007 | Zhang et al. | |
| 2009/0214668 A1 | | 8/2009 | Thompson | |
| 2010/0183868 A1 | | 7/2010 | Zhang et al. | |
| 2010/0297204 A1 | | 11/2010 | Uhr et al. | |
| 2012/0121809 A1 | | 5/2012 | Vuozzo | |
| 2013/0181157 A1 | * | 7/2013 | Guo | A62D 1/06 252/2 |

FOREIGN PATENT DOCUMENTS

| | | |
|---|---|---|
| EP | 1985181 | 10/2008 |
| WO | WO148450 | 12/2010 |
| WO | WO2013/023580 A1 * | 2/2013 |

* cited by examiner

*Primary Examiner* — Anthony J Green
(74) *Attorney, Agent, or Firm* — San Diego IP Law Group LLP; Trevor Coddington

(57) ABSTRACT

The present invention is directed to an aqueous-based fire inhibitor formulation comprising potassium salts and high nitrogen-based constituents encapsulated with a binder. The formulation contains no halogenated or toxic materials and is considered safe around adult humans and animals. The solvent is water-based and the dry state of the formulation emits virtually zero volatile organic compounds.

19 Claims, 2 Drawing Sheets

FIRE INHIBITOR FORMULATION

CROSS-REFERENCE TO RELATED APPLICATION

The present application is a continuation-in-part application of U.S. patent application Ser. No. 15/238,463, filed on Aug. 16, 2016, and entitled "Formulation and Method for Preserving Wood," the entire disclosure of which is incorporated by reference herein.

BACKGROUND OF THE INVENTION

1. Field of Invention

This invention relates to fire inhibitor formulations and methods for rendering materials non-flammable.

2. Description of Related Art

According to the U.S. Fire Administration, an estimated 377,900 home fires were reported to U.S. fire departments each year between 2012 to 2014. These fires caused 2,635 deaths, 12,525 injuries, and $7.1 billion in property loss. Fire spreads quickly; there is no time to gather valuables or make a phone call. In just two minutes, a fire can become life-threatening. In five minutes, a residence can be engulfed in flames. Heat and smoke from fire can be more dangerous than the flames. Inhaling the super-hot air can sear lungs. Fire also produces poisonous gases. Asphyxiation is the leading cause of fire deaths, exceeding burns by a three-to-one ratio.

Fire retardants reduce the flammability of materials by either blocking the fire physically or by initiating a chemical reaction that stops the fire. Many such fire retardant products are commercially available though few such products are non-toxic and water-soluble.

There are several ways in which the combustion process can be retarded by physical action: by cooling—some chemical reactions cool the material down; by forming a protective layer that prevents the underlying material from igniting; and by dilution—some retardants release water and/or carbon dioxide while burning, which may dilute the radicals in the flame enough for it to go out. Commonly used fire retardant additives include mixtures of huntite and hydromagnesite, aluminium hydroxide, and magnesium hydroxide. When heated, aluminium hydroxide dehydrates to form aluminum oxide (alumina, $Al_2O_3$), releasing water vapor in the process. This reaction absorbs a great deal of heat, cooling the material into which it is incorporated. Additionally, the residue of alumina forms a protective layer on the material's surface. Mixtures of huntite and hydromagnesite work in a similar manner and endothermically decompose releasing both water and carbon dioxide, giving fire retardant properties to the materials in which they are incorporated.

Chemical reactions in the flame (i.e., gas phase) can be interrupted by fire retardants. Generally, these retardants are organic halides (haloalkanes) such as halon and PhostrEx. However, there are situations where the released gas might be more dangerous when this type of retardant is involved. Some retardants break down polymers so they melt and flow away from the flame. Although this allows some materials to pass certain flammability tests, it is not known whether fire safety is truly improved by the production of flammable plastic droplets. For carbon-based fuels, solid phase flame retardants cause a layer of carbonaceous char to form on the fuel surface. This char layer is much harder to burn and prevents further burning. Intumescents add chemicals that cause swelling up behind the protective char layer, providing much better insulation behind the protective barrier. In addition to being added to plastics, intumescents are available as paints for protecting wooden buildings or steel structures.

Unlike fire retardants, which only delay the start of fires, a fire inhibitor prevents fires from starting. A fire inhibitor will stop the surface from burning not simply increase the combustion time of the surface. For example, Hartindo AF21 is a proprietary liquid fire inhibitor solution developed in Indonesia and used for coating lumber to make it fire resistant. Hartindo AF21 consists of approximately sixty-five to seventy-five percent (65-75%) water; approximately twenty-five to thirty-five percent (25-35%) of a combination of various nitrogen and salt based compounds forming a quaternary salt compound; and approximately one percent (1%) of an undisclosed, trade secret protected, formula. Due to its proprietary nature, AF21 is extremely expensive and competing products, which may be offered at a lower price, are scarce, if not non-existent. In addition, the trade secret protected formula is sourced from South East Asia and its supply has been limited in the United States since 2013. Moreover, the manufacturer of AF21 has not passed certification tests (or obtained regulatory approvals) for use of AF21 in the United States.

SUMMARY OF THE INVENTION

The present invention overcomes the above-noted and other deficiencies of the prior art, by providing a high-solids, aqueous chemical composition of ammonium salts and high nitrogen-based constituents encapsulated with a binder. The composition is designed to inhibit combustion from fire.

In an embodiment of the invention, an aqueous fire inhibitor composition comprises: water, ammonium bromide, monoammonium phosphate, diammonium phosphate, ammonium sulfate or urea, and a binder encapsulating the ammonium bromide, monoammonium phosphate, diammonium phosphate, and the ammonium sulfate or the urea. The binder comprises aryl ether phosphate or aloe vera, and pine oil. A mixture of sodium bromide and ammonium fluoride can be substituted for the ammonium bromide. Sodium carbonate can be included to increase the pH above 6.0, above 6.4, and above 6.8. The composition can comprise both ammonium sulfate and urea.

In another embodiment of the invention, a method for creating an aqueous fire inhibitor composition comprises the steps of: adding diammonium phosphate, ammonium bromide, urea or ammonium sulfate, and monoammonium phosphate to water to form a mixture; agitating the mixture to form a homogenous mixture; and adding a binder to the homogenous mixture to form a single non-covalent bond molecule. The binder comprises aryl ether phosphate or aloe vera, and pine oil. The diammonium phosphate, ammonium bromide, urea or ammonium sulfate, and monoammonium phosphate are added in that respective order. The method may further comprise blending the binder with the homogenous mixture to form a blended mixture; and removing impurities from the blended mixture. Removing impurities from the blended mixture comprises separating float material from the blended mixture and/or draining the blended mixture from the bottom of a container containing the blended mixture.

In yet another embodiment of the invention, a product treated with a fire inhibitor composition comprises: a product, and a bound molecule comprising ammonium bromide, monoammonium phosphate, diammonium phosphate, and ammonium sulfate or urea. The product is selected from the group consisting of: wood, a textile, a mattress, a furniture piece, a baby car seat cover, an airplane seat cover, carpet, clothing, a fabric laminated wall, cellulose insulation, wire insulation, and any combination thereof.

An advantage of the present invention is that the composition is made up of environmental- and people-friendly components. The composition contains no halogenated or toxic materials and can be considered safe around adult humans and animals. The solvent is water-based and the dry state of the composition emits virtually zero volatile organic compounds.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
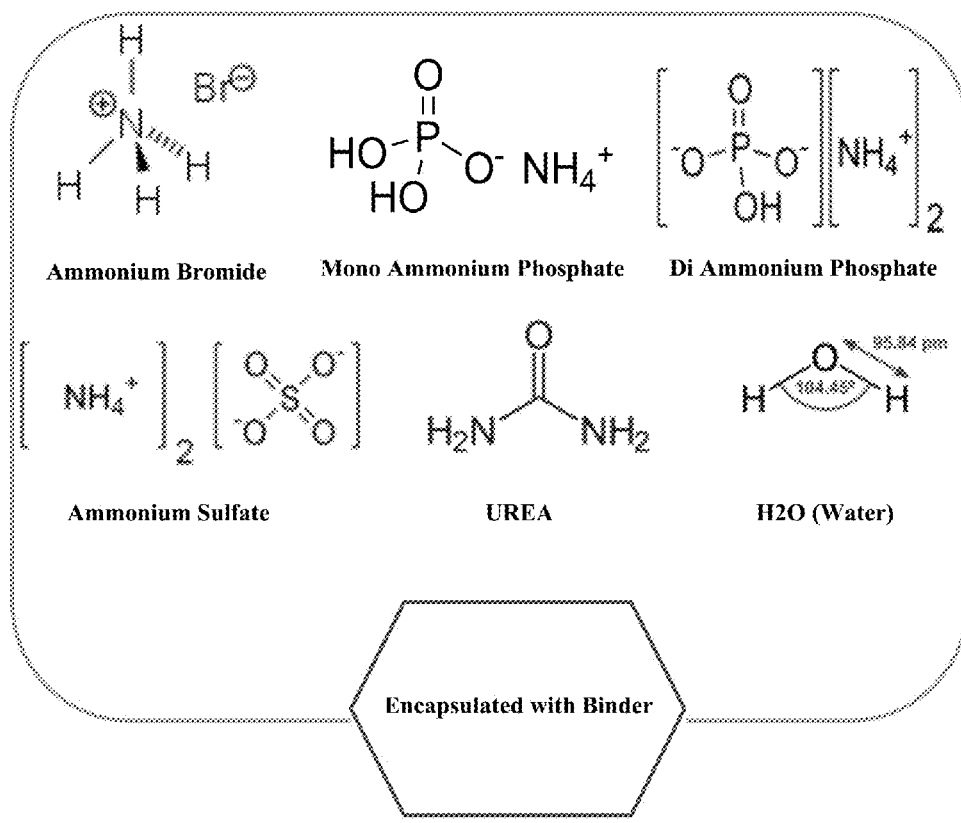
FIG. 1 illustrates chemical formula of the components employed in a fire inhibitor composition according to an embodiment of the invention.

Preferred embodiments of the present invention and their advantages may be understood by referring to FIG. 1, wherein like reference numerals refer to like elements. The present invention as described herein is directed to fire inhibitor formulations (i.e., compositions) and methods of use thereof for rendering materials non-flammable. The terms "preserving," "protecting," and "treating," (and variations in usage, for example, preservation and preservative) are used interchangeably herein and meant to include any methods of, and formulations for, rendering materials non-flammable. Although the present invention is described in the context of rendering wood non-flammable, any type of material may be protected using the formulations and methods described herein. For example, materials may include, but are not limited to textiles (natural and/or synthetic), mattresses, furniture, baby car seat covers, airplane seat covers, carpeting, clothing, fabric laminated walls, cellulose insulation, and wire insulation. The terms "wood," "wood product," and "wood substrate," are also used interchangeably herein and meant to include any object containing any amount of wood.

In sum, the fire inhibitor formula of the present invention is a blend of high nitrogen-based salts comprising synergistic constituents all bound together by an aryl ether phosphate, i.e., a surfactant, which produces a homogenous aqueous based, non-toxic, zero VOCs fire inhibitor. This fire-inhibiting formula works in the following manner to inhibit combustion. Oxygen travels in pairs except when acted on by an outside force breaking the covalent bond, thus creating a free radical. Something has to break the bond before this free radical (i.e., fire) is isolated or captured. The rapid heating of molecules toward fire point or an increased temperature causes the electrons in completed octets to change energy fields (go from a non-excited state to an excited state . . . 1s2s2p, etc.). Once combustion occurs, the free radicals are formed (from the broken covalent bond) and an opposite or cancelling free radical is generated by the fire inhibitor. Once the free radicals are isolated or cancelled out, the fire is extinguished, i.e., combustion is inhibited, and all the excited molecules go back to their normal function or non-excited state.

FIG. 1 illustrates the chemical formula of the components employed in a fire inhibitor composition according to an embodiment of the invention. The components include ammonium bromide, monoammonium phosphate (MAP), diammonium phosphate (DAP), ammonium sulfate, carbamide (urea), and water, which are all encapsulated with a binder. Hydrogen and oxygen atoms are available in each component. The key to allowing all of these components to live homogenously is the balance of available hydrogen and oxygen atoms with the availability of nitrogen atoms. Combustion is inhibited because the nitrogen and hydrogen atoms create the free radicals, which when excited, cancel out the free radicals created upon ignition of fire.

Ammonium bromide is a dominate constituent in the mixture because it provides great fire resistance for wood-based substrates. Ammonium bromide decomposes to ammonia and hydrogen bromide when heated at elevated temperatures, which provides great synergy with the other components. In an alternative embodiment of the invention, a combination of sodium bromide and ammonium fluoride can be substituted for the ammonium bromide.

MAP provides synergy and balance with the DAP and has been known to be incorporated in dry powder fire extinguishers. DAP can be used as a fire retardant as well. It decreases maximum weight loss rates, and causes an increase in the production of residue or char which is a key component for duration of fire resistance.

Ammonium sulfate has also been used in flame retardant compositions acting much like DAP. As a flame retardant, it increases the combustion temperature of the material, decreases maximum weight loss rates, and causes an increase in the production of residue or char. Its flame retardant efficacy can be enhanced by blending it with ammonium sulfate compositions.

Urea has a very neutral pH and serves an important role in the metabolism of nitrogen-containing compounds. Urea has natural fire proofing properties. In an alternative embodiment of the invention, ammonium sulfate and urea are interchangeable and one or the other can be eliminated if so desired.

In an embodiment of the invention, the binder comprises an aryl ether phosphate (potassium salt), which provides excellent stability of the above formulation allowing for long-term shelf life. The aryl ether phosphate is blended with a highly concentrated oil such as, but not limited to, pine oil, at preferably a ratio of 15:85 (i.e., eighty-five percent (85%) pine oil). However, the ratio may range from 35:65 (i.e., sixty-five percent (65%) pine oil) to 5:95 (i.e., ninety-five percent (95%) pine oil). In addition to serving as a product smell identifier or "marker," the pine oil is employed to provide mineral floatation action. During manufacturing of the fire inhibitor, the pine oil rises to the top of the mixture bringing along any impurities in the components, thereby providing a chemical/mechanical filtering of the formulation. Note that when the binder is mixed (i.e., the aryl ether phosphate is combined with pine oil), a very low RPM should be used, preferably not more than 250 RPM, because flocculation will occur at higher speed mixing.

In an alternative embodiment of the invention, an aloe vera solution can be substituted in place of the aryl ether phosphate and pine oil. For example, aloe vera (e.g., aloe barbadensis) in a concentrated form of 40:1 or higher can be used instead of the aryl ester phosphate and pine oil. Use of this constituent as the binder is permissible due to the reaction of the high electrolyte content of the aloe vera extract. Preferably, the aloe vera solution is added in a range of one and two-tenths to one and four-tenths percent (1.2% to 1.4%), and more preferably at one and thirty-six-hundredths percent (1.36%) of the total mixture by weight. Using a higher concentrated gel typically manufactured utilizing low temperature evaporation to increase the concentration yields a higher specific gravity which plays the same role as the pine oil for the mechanical properties of the mineral flotation discussed below to remove impurities. If a marker of smell is desired, terpene type oil can be employed to develop a final smell or personality of the mixture.

The present fire inhibitor formulation is particularly suited for fabrics and cellulose-based compositions. It can be incorporated into the production of cotton and other synthetic-type fabrics such as polyester. In order to properly bond with these types of molecules, it is recommended that the temperature of the formulation be elevated during blending to further homogenize the salts to a finer molecule size. For example, a tank temperature of forty-degrees Celsius (40° C.) is used; when the urea is added, it will lower this temperature. The concentration level is preferably in the range of 17% solids, which is approximately half the amount required for cellulose- or wood-based substrates. In order for fabrics to maintain fire resistance, it is best to blend the fire inhibitor formulation into the dye and or initial treatments applied to fabrics because this will bond the chemistry to be a permanent treatment. Other fabric-based applications include mattresses, furniture, baby car seat covers, airplane seat covers, etc. The present invention can also be incorporated into washing machine cycles to provide bed sheets and clothes with immediate fire resistance. The present invention can be formulated with additional surfactants such as soap and/or soap derivatives to become a fire resistive carpet shampoo.

For cellulose- and/or wood-based substrates, a highly concentrated formulation of approximately thirty-two percent (32%) solids is preferably created in order to achieve proper fire performance. For example, application of the fire inhibitor formulation (with such a solids content) to a wood-based substrate pass the ASTM E84 surface burning characteristics test with a class A rating. The fire inhibitor has an acidic balance approximately 5.8 pH. In wood treatments, acidic/lower pH applications have the tendency to corrode iron-based nails/fasteners and mounting hardware over time. Other preservatives of higher pH can be added to mitigate corrosion. For example, Boron can be added as a buffering agent. Alternatively, buffers such as sodium bicarbonate or sodium carbamate can be employed. A maximum pH of 6.9 can be achieved before a disruption of chemical balance will occur.

After treatment of a product with the fire inhibitor formulation, whether directly or through an intermediate mixture containing other preservatives (fungicide, biocide, pesticide, etc.), the product comprises the components noted herein absent the water, which has evaporated off. This final combination of components can be considered an ester or salt compound that is all bound by the binder. In other words, all that is left behind with the product are the components minus the water in a bound molecule that is effectively irreversible through non-covalent bonds. Therefore, it is a unique molecule that has been bound by the binder.

Figure 2:
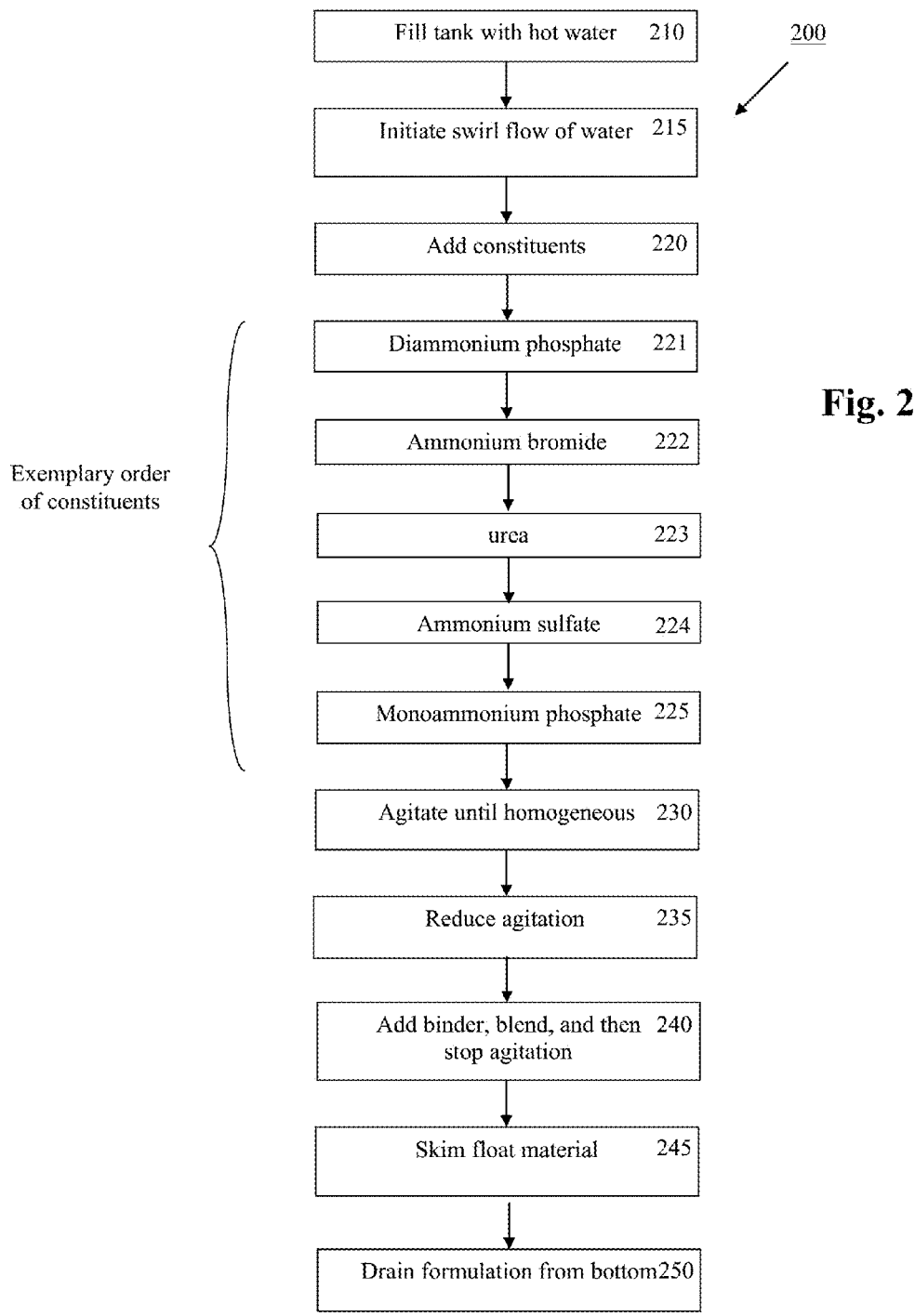
FIG. 2 illustrates a method for creating a fire inhibitor formulation according to an embodiment of the invention.

FIG. 2 illustrates a method 200 for creating a fire inhibitor formulation according to an embodiment of the invention. Prior to blending of the constituents, it is preferable that all powder additives are in a granular state. For example, ammonium bromide is generally obtained in rock form and must undergo granulation, the implementation of which is apparent to one of ordinary skill in the art, to form granules or pellets. A mixing tank such as a 2,000 gallon stainless steel tank with agitator is employed and should be cleaned to remove any contaminates. All constituents must be staged by weight in order to be ready for mixing into the tank.

The method begins with filling (step 210) the mixing tank with hot water. For example, 13,028.35 pounds of hot water, which represents 66.65% of the overall formulation, is added. The agitator speed is set at approximately 15 RPM for a minimum of five (5) minutes to initiate (step 215) swirl flow of the water. Each constituent is slowly added (step 220) into the tank. The list of constituents is ordered from alkaline to acidic pH and therefore, the order is preferable, but not critical, to keep the pH level moving from alkaline to acidic levels. For example, 951.96 pounds of diammonium phosphate is added (step 221). 2,533.34 pounds of ammonium bromide is then added (step 222). 961.73 pounds of urea is then added (step 223). 844.45 pounds of ammonium sulfate is then added (step 224). 961.73 pounds of monoammonium phosphate is then added (step 225). After all these powder constituents have been added, the agitator speed is increased (step 230) to 50 RPM for thirty (30) minutes. Note that if swirl flow is increased beyond or approaching the top of the tank, the agitator speed can be reduced to a minimum of 25 RPM. All powder constituents must be homogenized prior to moving on to next step. Agitator speed and run time can be adjusted, accordingly.

The agitator is reduced (step 235) to 15 RPM and the binder is slowly added (step 240) into the mixing tank. For example, 265.85 pounds of the binder is added. Once the binder is added, the mixture is blended for an additional thirty (30) minutes. The agitator is then stopped leaving the tank to settle for a minimum of three or four hours depending on batch size; however, overnight is preferred.

Any impurities in the mixture will rise to the top of the tank via the pine oil in the binder. This is due to the high density of the pine oil rising to the top, which provides a mechanical filtering action. For example, the resultant impurities are visible as brown clumps and a thick ring of byproduct or waste around the top of the tank. This float material can be skimmed (step 245) at the top of the mixture surface. In an embodiment of the invention, the skimmed float material is strained with a filter such as a fifty (50) micro filter bag to separate the pine oil from the contaminants. The separated liquid can be stored with additional binder and recycled for use in a next batch of formulation to be manufactured. This recycling also minimizes the amount of waste for disposal.

The tank is drained (step 250) from the bottom to extract the clean filtered finished fire inhibitor product. The extracted fire inhibitor formulation may be stored in containers for an indefinite period of time. Upon long durations of storage, the fire inhibitor formulation may be re-agitated to homogenize the mixture and avoid any settling of the constituents.

Table 1 provides a recap of the fire inhibitor components discussed above.

TABLE 1

| Description | % of mix | Weight LBS | Weight/Gal |
| --- | --- | --- | --- |
| Water | 66.65% | 13028.35 | 6.563 |
| Diammonium phosphate | 4.87% | 951.96 | 0.480 |
| Ammonium bromide | 12.96% | 2533.34 | 1.276 |
| Urea | 4.92% | 961.73 | 0.484 |
| Ammonium sulfate | 4.32% | 844.45 | 0.425 |
| Monoammonium phosphate | 4.92% | 961.73 | 0.484 |
| Binder | 1.36% | 265.84 | 0.134 |

Here, the fire inhibitor formulation has a specific gravity of 1.18 and a pH of 5.8 to 5.9. The above-noted constituent weights produce 1,985 gallons of formulation. The above specification is an exemplary embodiment of the invention. In other embodiments of the invention, the concentrations of individual constituents can be varied while still maintaining the desired chemical and fire inhibitor properties of the end, resulting fire inhibitor formulation as described herein. For example, in one embodiment of the invention, the concentration of the diammonium phosphate can be varied in the range of three to six percent (3 to 6%). In another embodiment of the invention, the concentration of the ammonium bromide can be varied in the range of ten to sixteen percent (10 to 16%). In another embodiment of the invention, the concentration of the urea can be varied in the in the range of three to seven percent (3 to 7%). In another embodiment of the invention, the concentration of the ammonium sulfate can be varied in the range of three to five and five-tenths percent (3 to 5.5%). In another embodiment of the invention, the concentration of the monoammonium phosphate can be varied in the range of three to seven percent (3 to 7%). In another embodiment of the invention, the concentration of binder can be varied in the range of one to two percent (1 to 2%).

The formula of Table 1 is a non pH adjusted formula and represents a high solids mixture for use on wood substrates. For example, this fire inhibitor formulation can be used as a constituent in the wood preservative formulations disclosed in commonly-owned U.S. patent application Ser. No. 15/238,463. There, the present fire inhibitor is added to an aqueous-based concentrate comprising an acrylate copolymer, water, a wetting and dispersing additive, an antifoaming agent, a glycol, a rheological additive, a fungicide, and a biocide, and a borate pesticide. The wetting and dispersing additive comprises a water-based solution of a high molecular weight block copolymer with pigment affinic groups. The glycol is propylene glycol. The rheological additive is a natural earth clay powder or fumed silica. The concentrate may further comprise a colorant. Those wood preservative formulations are particularly suited for advanced framing lumber (AFL) and pressure-treated industry standard fire-retardant treated wood (FRTW) lumber. These wood preservative formulations have been determined by an ANSI-accredited professional engineering firm to be suitable to treat structural wood products used in above-ground applications where they are required to be compliant with International Building Code (IBC) §§2303.1.18, 2304.11, and 2304.12; International Residential Code (IRC) §§R317, R318, and R802.1.5; ASTM D198, D3273, D5116, D5197, and D5590, E84; AWPA E12; UL 2818; and California §01350, which specify standards for preservative-treated wood, fungal decay resistance, mold growth inhibition, protection from subterranean termites (including Formosan), flame spread and smoke developed properties, reaction with metals, flexure, and emissions of volatile organic compounds including formaldehyde and other carbonyl compounds.

For the treatment of general fabrics, the constituent percentages listed in Table 1 can be reduced by fifty percent (50%) and the percentage of water increased by the same amount. This provides the advantage of lowering cost of the application and reduces the solids content. If there are too many solids in the fabric upon drying, the flexibility/pliability of the fabric may be negatively impacted.

In another embodiment of the invention, the pH of the fire inhibitor formulation of Table 1 can be increased. For example, certain application such as wood treatment (where corrosion of nails and other fasteners is a concern) requires a less acidic or more neutral pH composition. Through use of a buffer such as sodium carbonate (anhydrous), the pH can be increased to 6.9 while still containing all of the solids. The sodium carbonate can be added to the water to increase the pH of the water prior to blending all other constituents into the water. Alternatively, the sodium carbonate can be added to an already finished fire inhibitor formulation, e.g., the formulation of Table 1.

Table 2 specifies the fire inhibitor components in a pH modified fire inhibitor formulation as discussed above.

TABLE 2

| Description | % of mix | Weight Lbs | pH Measure |
| --- | --- | --- | --- |
| Water | 64.19% | 0.790 | 8.40 |
| Sodium carbonate | 2.46% | 0.031 | 11.25 |
| Diammonium phosphate | 4.87% | 0.061 | 9.30 |
| Ammonium bromide | 12.96% | 0.162 | 8.48 |
| Urea | 4.92% | 0.061 | 8.58 |
| Ammonium sulfate | 4.32% | 0.054 | 8.57 |
| Monoammonium phosphate | 4.92% | 0.061 | 6.80 |
| Binder | 1.36% | 0.017 | 6.90 |

Here, the fire inhibitor formulation has a specific gravity of 1.21 and a pH of 6.9. With the addition of two and forty-six hundredths of a percent (2.46%) of sodium carbonate the solids increase to a total of thirty-four and forty-five hundredths of a percent (34.45%) by weight. In alternative embodiments, the amount of sodium carbonate can be varied to adjust the overall pH. For example, with the addition of only 0.6% sodium carbonate, the final pH was 6.0.

When adding the monoammonium phosphate (MAP) as the last step before the binder addition, it is important to add such in increments as this component is acidic and will cause an off-gassing chemical reaction. In order to minimize the effects of this reaction, this component shall be added in twenty percent (20%) increments.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An aqueous fire inhibitor composition comprising:
water,
ammonium bromide,
monoammonium phosphate,
diammonium phosphate,
ammonium sulfate or urea, and a binder encapsulating the ammonium bromide, the monoammonium phosphate, the diammonium phosphate, and the ammonium sulfate or the urea.

2. The aqueous fire inhibitor composition of claim 1, wherein the binder comprises aryl either phosphate.

3. The aqueous fire inhibitor composition of claim 1, wherein the binder comprises pine oil.

4. The aqueous fire inhibitor composition of claim 1, wherein the binder comprises aloe vera.

5. The aqueous fire inhibitor composition of claim 1, further comprising sodium carbonate.

6. The aqueous fire inhibitor composition of claim 5, wherein the pH of the aqueous fire inhibitor composition is greater than 6.0.

7. The aqueous fire inhibitor composition of claim 6, wherein the pH of the aqueous fire inhibitor composition is greater than 6.4.

8. The aqueous fire inhibitor composition of claim 7, wherein the pH of the aqueous fire inhibitor composition is greater than 6.8.

9. An aqueous fire inhibitor composition comprising:
water,
a mixture of sodium bromide and ammonium fluoride,
monoammonium phosphate,
diammonium phosphate,
ammonium sulfate or urea, and
a binder encapsulating the mixture of sodium and ammonium fluoride, the monoammonium phosphate, the diammonium phosphate, and the ammonium sulfate or the urea.

10. A method for creating an aqueous fire inhibitor composition, the method comprising the steps of:
adding diammonium phosphate, ammonium bromide, urea or ammonium sulfate, and monoammonium phosphate to water to form a mixture;
agitating the mixture to form a homogenous mixture; and
adding a binder to the homogenous mixture to form a fully bonded molecule formula.

11. The method of claim 10, wherein the binder comprises aryl ether phosphate.

12. The method of claim 10, wherein the binder comprises pine oil.

13. The method of claim 10, wherein the binder comprises aloe vera.

14. The method of claim 10, wherein the diammonium phosphate, ammonium bromide, urea or ammonium sulfate, and monoammonium phosphate are added in that respective order.

15. The method of claim 10, further comprising the steps of:
blending the binder with the homogenous mixture to form a blended mixture; and
removing impurities from the blended mixture.

16. The method of claim 15, wherein the step of removing impurities from the blended mixture comprises separating float material from the blended mixture.

17. The method of claim 15, wherein the step of removing impurities from the blended mixture comprises draining the blended mixture from a bottom of a container containing the blended mixture.

18. A product treated with a fire inhibitor composition comprising:
a product, and
an aqueous fire inhibitor composition comprising water, ammonium bromide, monoammonium phosphate, diammonium phosphate, ammonium sulfate or urea, and a binder encapsulating the ammonium bromide, the monoammonium phosphate, the diammonium phosphate, and the ammonium sulfate or the urea.

19. The product of claim 18, wherein the product is selected from the group consisting of:
wood, a textile, a mattress, a furniture piece, a baby car seat cover, an airplane seat cover, carpet, clothing, a fabric laminated wall, cellulose insulation, wire insulation, and any combination thereof.

* * * * *